United States Patent [19]
Ingraham et al.

[11] Patent Number: 5,222,840
[45] Date of Patent: Jun. 29, 1993

[54] DOUBLE PLENUM AIR CONVEYOR/ACCUMULATOR

[75] Inventors: Thomas Ingraham, West Liberty; Thomas Pearson, Sidney, both of Ohio

[73] Assignee: The Stolle Corporation, Sidney, Ohio

[21] Appl. No.: 719,282

[22] Filed: Jun. 21, 1991

[51] Int. Cl.$^5$ .................................. B65G 51/03
[52] U.S. Cl. ......................... 406/88; 226/97; 406/89; 406/95; 406/194
[58] Field of Search ............... 406/86, 88, 89, 94, 406/95, 194; 34/57 R, 57 A, 57 B, 57 C; 226/97; 198/836.2, 860.2, 860.3

[56] References Cited

U.S. PATENT DOCUMENTS

| | | | |
|---|---|---|---|
| 3,250,573 | 5/1966 | Clarke et al. | 406/88 |
| 3,395,943 | 8/1968 | Wilde et al. | 406/88 |
| 3,555,693 | 1/1971 | Futer | 34/1 P |
| 3,889,744 | 6/1975 | Hill et al. | 165/83 |
| 3,890,011 | 6/1975 | Futer | 406/83 |
| 3,924,571 | 12/1975 | Holman | 119/15 |
| 3,929,420 | 12/1975 | Wood | 422/171 |
| 4,016,729 | 4/1977 | Cherry | 62/259.1 |
| 4,060,025 | 11/1977 | Pelosi, Jr. | 454/294 |
| 4,392,760 | 7/1983 | Futer | 405/87 |
| 4,528,941 | 7/1985 | Spangler | 119/15 |
| 4,561,806 | 12/1985 | Lenhart | 406/88 |
| 4,730,955 | 3/1988 | Lenhart | 406/88 |
| 4,730,956 | 3/1988 | Lenhart | 406/88 |
| 4,744,702 | 5/1988 | Wiseman et al. | 406/88 |
| 4,750,277 | 6/1988 | Kuhl | 34/217 |

Primary Examiner—David M. Mitchell
Assistant Examiner—Andrew C. Pike
Attorney, Agent, or Firm—David W. Brownlee; George K. Stacey; David V. Radack

[57] ABSTRACT

An air conveyor moves light objects from one location to another and may also act as an accumulator for storing objects transported thereon. The conveyor has an elongated primary plenum and one or more elongated body members disposed over and in communication with the primary plenum through openings in the bottom wall of each body member. Each body member has a generally planar top deck disposed thereover. Each body member defines a secondary plenum between the top deck and the bottom wall of the body member. The top deck has a plurality of directional orifices formed therein. Blowers in communication with the primary plenum supply air to the secondary plenum through the primary plenum. The air from the secondary plenum is delivered through the directional orifices in the top deck and creates a current, or cushion, of air on which the objects move. Manually adjustable dampers are provided for restricting the size of the openings and regulating the air pressure between the primary plenum and the secondary plenums. The conveyor may also have guide rails for controlling object movement.

42 Claims, 6 Drawing Sheets

FIG. 7

DOUBLE PLENUM AIR CONVEYOR/ACCUMULATOR

BACKGROUND OF THE INVENTION

1. Field of the invention

This invention relates to an air conveyor/accumulator for transporting objects from one location to another and for storing objects between work stations, and, more specifically, to an air conveyor/accumulator having two plenums, one for air transport and one for supplying air to the top deck.

2. Description of the Prior Art

Air conveyors are commonly used for the rapid transport of relatively light objects from one location to another. One typical use of air conveyors is in the transport of empty aluminum or steel cans, for example, from a forming machine to a filling machine.

U.S. Pat. Nos. 3,890,011; 4,392,760; and 4,744,702 are representative of prior art air conveyors. The prior art air conveyors utilize an elongated plenum with a top deck disposed over that plenum. Air is introduced into the plenum using a blower means, such as a fan. Air from the plenum is discharged through a plurality of directional openings in the top deck, thereby creating an air jet that impinges on the objects being conveyed and moves the objects longitudinally along the conveyor.

The fan may be located outside of the plenum and connected thereto through a duct. An example of this configuration is illustrated in U.S. Pat. No. 3,890,011. Alternatively, the fan may be mounted in the plenum, as illustrated in U.S. Pat. No. 4,392,760. The conveyor is typically divided into zones that are closed at each end. Separate fans are provided for each zone.

The designs of the prior art have several drawbacks. First, in order to maintain adequate consistency and control of the speed of objects moving on the conveyor, short zones are required. However, having short zones increases the number of fans required, which increases the overall cost, as distinguished from operational costs, of the conveyor.

A second drawback with prior art designs results when there is a gap in the joints between sections of the top deck. Air conveyors are manufactured in sections and then assembled on site. This results in joints separating sections of the top deck. When the joints fall within a fan zone, they are under air pressure. If there is a gap in the joint, air may be discharged onto the top deck in a vertical stream, perpendicular to the direction in which the objects on the conveyor are traveling. This vertical stream, or "air knife", disrupts object travel on the conveyor. One known way of lessening the risk of "air knife" is to provide interlocking deck joints. However, the use of this type of joint greatly increases installation time compared with conveyors using flat, abutting joints. Moreover, this type of deck joint makes disassembly for maintenance more costly and time consuming because, in order to remove one section of top deck, at least one of the adjacent sections must also be removed to facilitate separation of the interlocking joints.

There remains a need for an air conveyor that has short, controllable pressure zones, yet does not require the use of separate blower means for each zone. In addition, there remains a need for an air conveyor having sections which may be easily and quickly assembled and disassembled, yet having deck joints which are not susceptible to "air knife".

SUMMARY OF THE INVENTION

The present invention has met the hereinbefore described needs. The air conveyor of this invention comprises an elongated primary plenum. One or more elongated body members are disposed over the primary plenum such that each is in communication with a portion of the open top thereof. Each body member has two generally parallel sidewalls. A partition having at least one opening therein is disposed between the primary plenum and the body member. An elongated generally planar top deck is disposed over the top of each body member. Each top deck has a plurality of directional orifices formed therein. Each body member defines a secondary plenum between the top deck and the partition separating the primary plenum and the body member. Each body member is closed at each end. Each secondary plenum is in communication with the primary plenum through the openings in the partition.

Blower means, such as a fan, provide air to the secondary plenums through the openings in the partition separating the body members and the primary plenum. The primary plenum transports air moved under the influence of the blower means to the secondary plenums positioned along the length of the primary plenum. The air in the secondary plenums is delivered to the upper surface of the top deck through the directional orifices. Each secondary plenum is a separate pressure zone for supplying air to the top deck. Delivery of the air through the directional orifices produces a generally longitudinally flowing current of air which engages and lifts the objects on the conveyor. The objects move longitudinally on the current, or cushion, of air.

Adjustable damper means may be provided to restrict the size of the openings between the primary plenum and the secondary plenums. This permits the pressure in each secondary plenum to be regulated.

The body members may be joined by abutting one end of a body member to the adjacent end of an adjacent body member. Because the secondary plenum defined by each body member is closed at each end, the joints between body members are not under elevated air pressure and, thus, are not susceptible to "air knife" problems even if gaps are present in the joints.

Guide means and a cover may be installed on the conveyor to define a path for object movement and to resist falling of objects from the conveyor.

The conveyor may also operate as an accumulator for storing the objects conveyed thereon. When operating as an accumulator, objects become packed and stopped on the conveyor as the result of decreased demand on the discharge end of the conveyor. The objects being conveyed stop on the conveyor but air flow from the directional orifices is continued. When demand at the discharge end increases, movement of the objects quickly resumes as the result of the continued presence of the air current from the directional orifices.

It is an object of this invention to provide an improved air conveyor for moving objects from one location to another.

It is an object of this invention to provide an air conveyor utilizing two plenums, one for transport of air from the blower and one for delivery of air to the top deck.

It is another object of this invention to provide an air conveyor having short pressure zones for supplying air to the top deck, thereby providing increased operator control of conveyor performance.

It is a further object of this invention to provide an air conveyor which does not require separate blower means for each pressure zone supplying air to the top deck.

It is another object to this invention to provide an air conveyor that requires fewer blowers per unit of conveyor length than prior art designs.

It is still another object of this invention to provide an air conveyor which can be assembled from separate conveyor sections.

It is another object of this invention to provide an air conveyor having air jets that impinge from the side of the conveyor to guide objects moving on the conveyor toward the center thereof and to assist in guiding objects into turns.

It is yet another object of this invention to provide an air conveyor which does not utilize interlocking joints between conveyor sections, thereby resulting in decreased installation costs.

It is a further object of this invention to provide an air conveyor having deck joints which are not susceptible to "air knife".

It is yet another object of this invention to provide an air conveyor in which the velocity of the air in the air transport plenum may be higher than in prior art designs without adversely affecting conveyor performance.

It is another object of this invention to provide an air conveyor having top deck sections that may be easily removed for maintenance and which are easily aligned when replaced.

It is still another object of this invention to provide an air conveyor capable of rapidly moving aluminum or steel cans from one location to another during handling and filling operations.

It is an object of this invention to provide an air conveyor that provides consistent conditions beneath the top deck by having air approach the top deck from directly below.

It is another object of this invention to provide an air conveyor having top deck stiffeners that run perpendicular to the direction of object travel.

These and other objects of this invention will be more fully understood from the following description on reference to the illustrations appended hereto.

BRIEF DESCRIPTION OF THE DRAWINGS

FIG. 3 is a plan view of the air conveyor of FIG. 1.

FIG. 3A is an enlarged fragmentary longitudinal cross-sectional view of the air conveyor of FIG. 3 taken through 3a-3a.

DESCRIPTION OF THE PREFERRED EMBODIMENT

Figure 1:
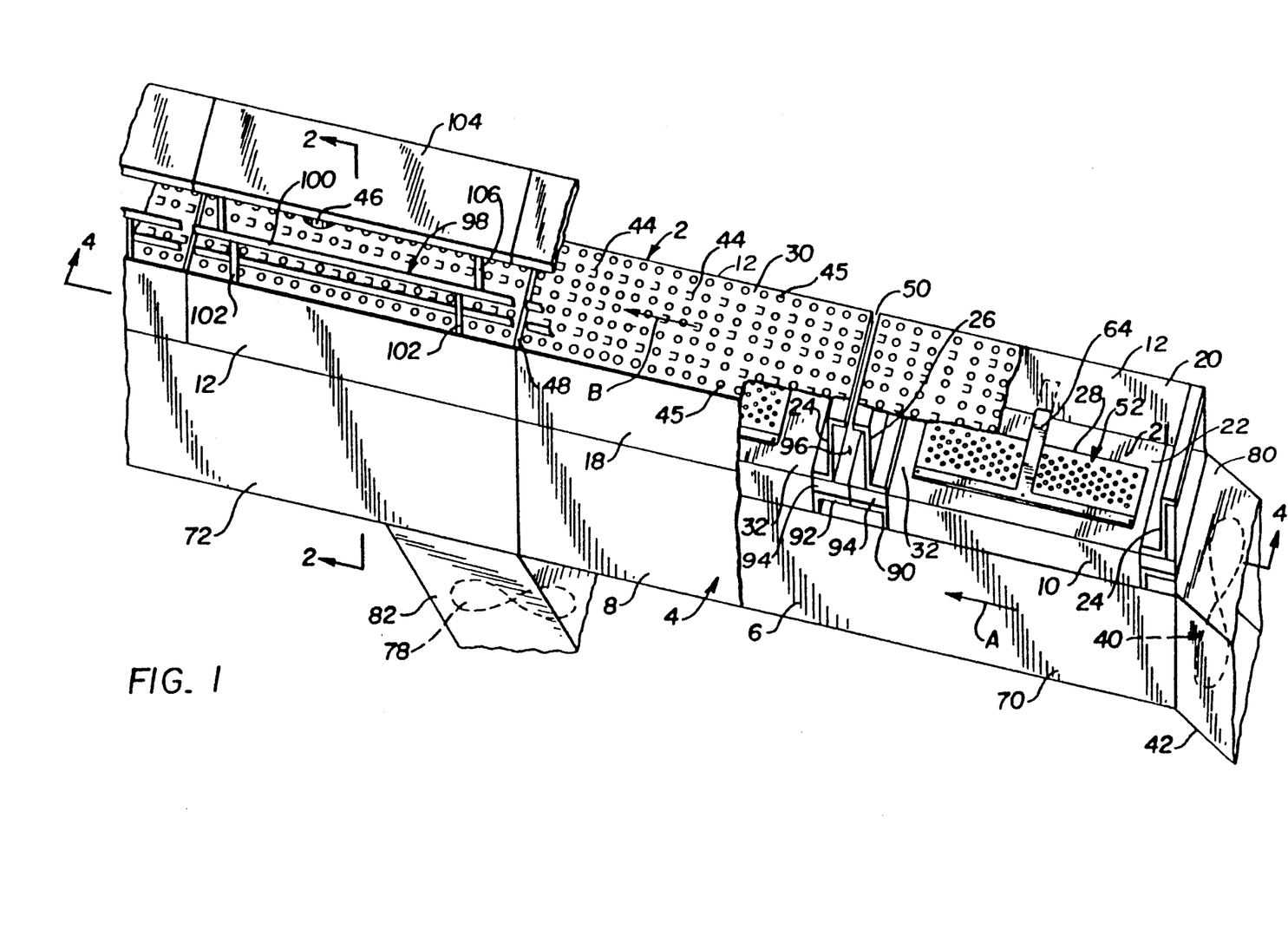
FIG. 1 is a cutaway schematic perspective view of an air conveyor of this invention.
Figure 2:
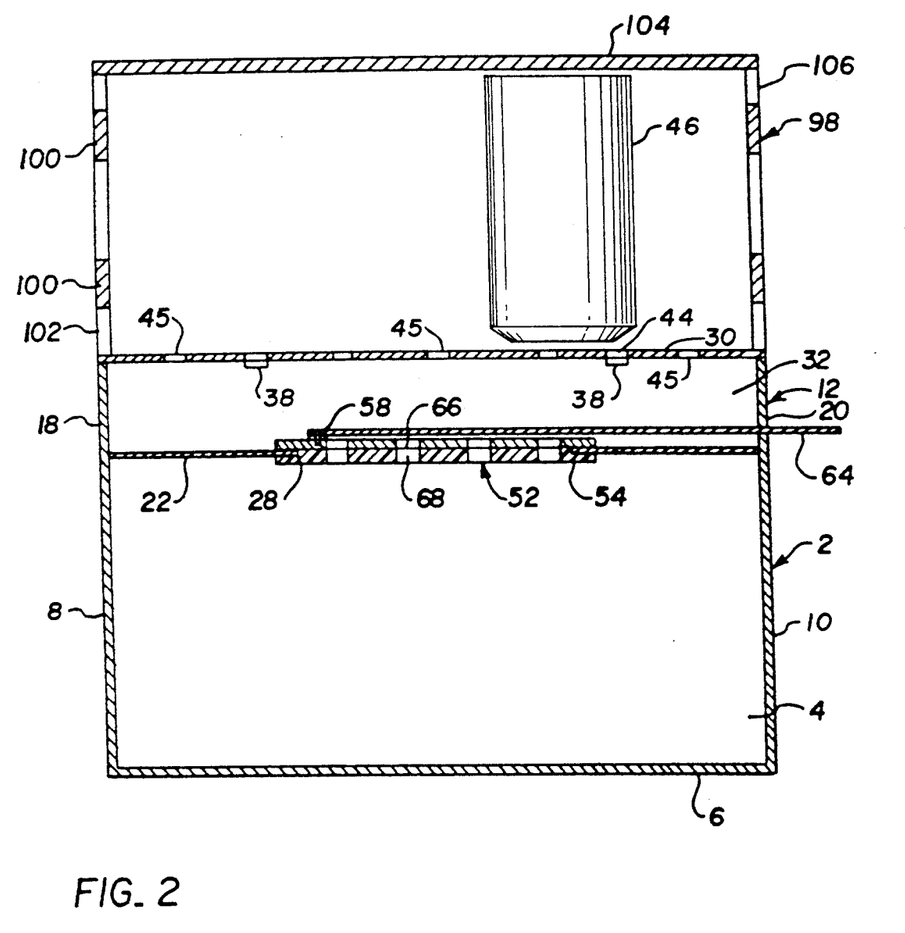
FIG. 2 is a transverse cross-sectional view of the air conveyor of FIG. 1 taken through 2—2.

Referring to FIGS. 1 and 2, there is shown a preferred embodiment of the air conveyor of this invention. Air conveyor 2 comprises elongated generally upwardly open primary plenum 4 having a base wall 6 and a pair of upstanding generally parallel sidewalls 8, 10.

One of more elongated body members 12 are disposed over primary plenum 4. Each body member 12 preferably has a pair of generally parallel sidewalls 18, 20, a bottom wall 22, and a pair of generally parallel ends 24, 26. Bottom wall 22 forms a partition between the primary plenum and the body members. However, it will be apparent that the partition could be a top wall of primary plenum 4. Each body member 12 is in communication with primary plenum 4 through one or more openings 28 formed in bottom wall 22 of each body member 12. An elongated, generally planar top deck 30 is disposed over each body member 12. Each body member 12 defines a secondary plenum 32 bounded by top deck 30, sidewalls 18, 20, bottom wall 22, and ends 24, 26.

Blower means 40 supplies air to conveyor 2. Blower means 40 is sized according to the desired air velocity and volume. It may, for example, be a 30-inch diameter fan powered by a 10 horsepower electric motor with an output of about 6,000 to 15,000 cubic feet per minute of air at a pressure of 2.5 inches W.G. A suitable blower is manufactured by Chicago Blower Corporation. However, it will be appreciated that any suitable blower may be used.

In the preferred embodiment, blower means 40 is located external to air conveyor 2 and is in communication with primary plenum 4 through duct 42. Air is preferably introduced into primary plenum 4 from blower means 40 at a velocity of about 1,000 to 5,000 feet per minute, a volume of about 5,000 to 27,000 CFM, and a pressure of 0.5 to 4.0 inches WG. Arrow A indicates the direction of air flow in primary plenum 4 in the preferred embodiment. However, it will be appreciated that the direction of air flow in primary plenum 4 is not required to be in the same direction as object travel.

Air is supplied to secondary plenums 32 from primary plenum 4 through openings 28 in bottom wall 22. This provides consistent conditions under the top deck 30 of each body member 12 because the air will always approach top deck 30 from directly beneath it. Top deck 30 preferably has a plurality of relatively spaced directional orifices 44, 45 formed therein. Air from secondary plenums 32 is discharged through directional orifices 44, 45 thereby creating a generally upward and longitudinal flowing current, or cushion, of air along the upper surface of top deck 30. The air discharged through directional orifices 44 is represented by arrow B. The air is preferably discharged through directional orifices 44 at an angle of about 10 to 30 degrees with respect to the horizontal upper surface of the top deck 30 and at a velocity of about 2,000 to 8,000 feet per minute. Air is preferably discharged through directional orifices 45 at a velocity of about 2,000 to 8,000 feet per minute. Air discharged through directional orifices 45 preferably produces a generally vertical air current perpendicular to the plane of top deck 30.

Objects 46 are lifted by the air current on top deck 30 and moved longitudinally over top deck 30 on the cushion of air. Because they are moved on a cushion of air, objects 46 have little or no contact with top deck 30 as they travel, thereby lessening the risk of damage to the objects arising from contact with top deck 30. Limited or no contact with top deck 30 also facilitates efficient transport of objects 46. The conveyor may also operate as an accumulator for storing objects 46 thereon. If demand for objects at the downstream end of the conveyor decreases, objects 46 will be stopped at the end of the conveyor and a plurality of objects 46 will back up on the conveyor. It will be appreciated that objects 46 may be stopped by a gate extending across the conveyor or by any other means known to those skilled in the art. Air flow from directional orifices 44, 45 will continue even when the objects have been stopped. The continued presence of the air flow will enable movement of all of stopped objects 46 to quickly resume when demand at the downstream end of the conveyor increases. In addition, it will be appreciated that objects 46 will be transported at a velocity which will not cause damage to the objects if they collide with objects 46 which have stopped. In the preferred embodiment, objects 46 are preferably aluminum or steel containers, such as two-piece cans. However, it will be appreciated that any objects that can be lifted and engaged by the air current may be transported on air conveyor 2.

Figures 3, 3A:
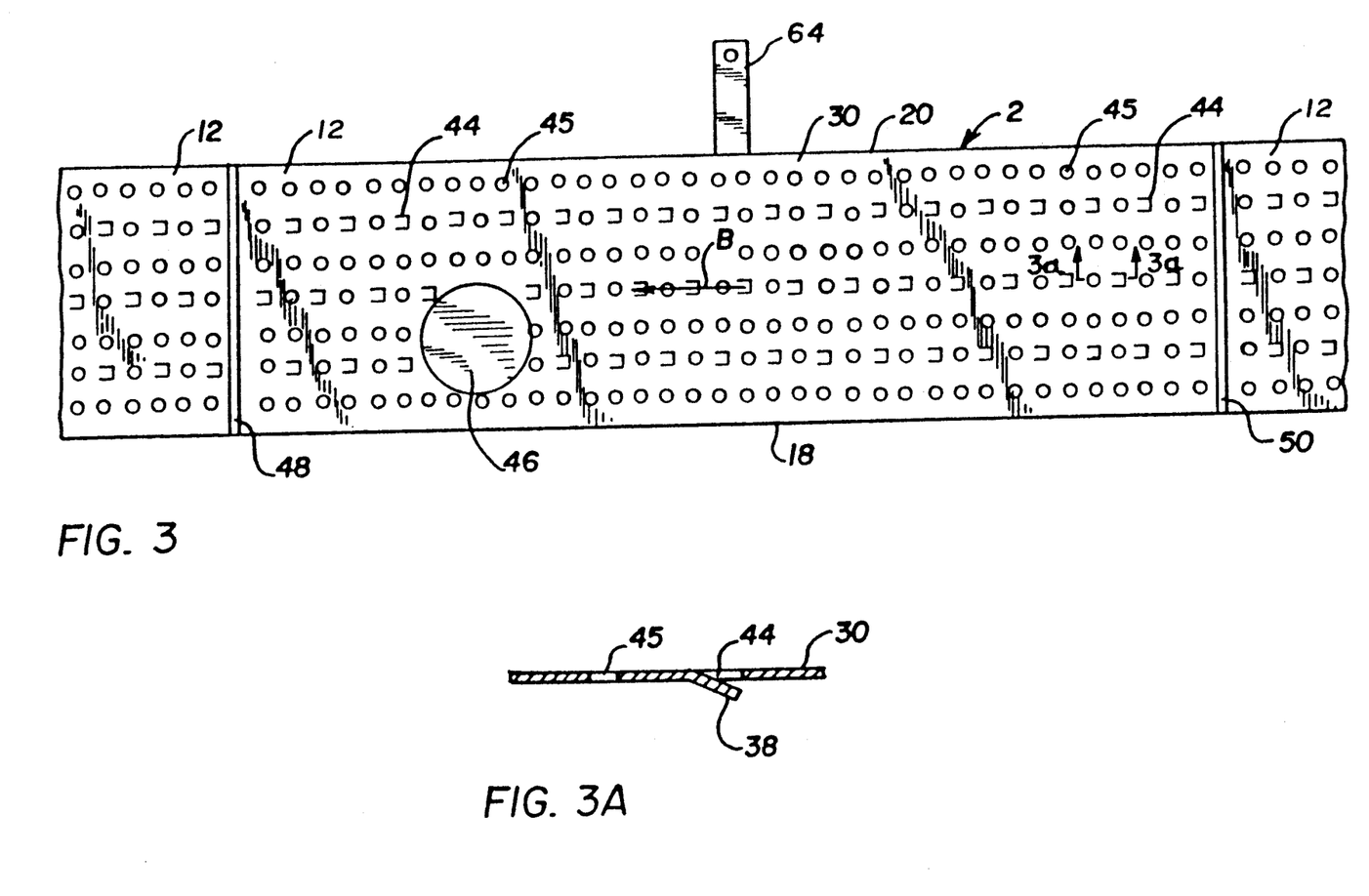

Referring to FIG. 3, there is shown a plan view of air conveyor 2. In the preferred embodiment, directional orifices 44 are preferably generally rectangular in shape in the plan view. Directional orifices 45 are are preferably generally circular in shape in the plan view. Each directional orifice 44, 45 preferably has an open area of about 0.02 to 0.04 square inches. As shown in FIG. 3A, each directional orifice 44 include a generally downwardly projecting lip 38. Lips 38 preferably are oriented at an angle of about 5 to 10 degrees below the plane of top deck 30. Lips 38 direct the air discharged from directional orifices 44 to the desired angle. Directional orifices 44 are preferably arranged in staggered rows as shown in FIG. 3, with a longitudinal center to center spacing of about 0.5 to 1.0 inches within a row and a transverse spacing of about 0.75 to 1.5 inches between the rows. Directional orifices 45 are preferably arranged in rows with directional orifices 44 interspersed among orifices 45. The outermost rows of directional orifices on top deck 30 are preferably directional orifices 45. The longitudinal center-to-center spacing of orifices 45 is preferably about 0.5 to 1.0 inches, where the longitudinal row is made up of only directional orifices 45. The transverse spacing between orifices 45 is preferably about 0.75 to 1.5 inches. Preferably, the open area of directional orifices 44, 45 will be about 1 to 2 percent of each section of top deck 30. FIG. 3A shows the preferred longitudinal cross-sectional shape of directional orifices 44. It will be appreciated that while a preferred embodiment of the configuration of directional orifices 44, 45 has been described, any suitable configuration of directional orifices known to those skilled in the art may be utilized with this invention.

Figure 4:
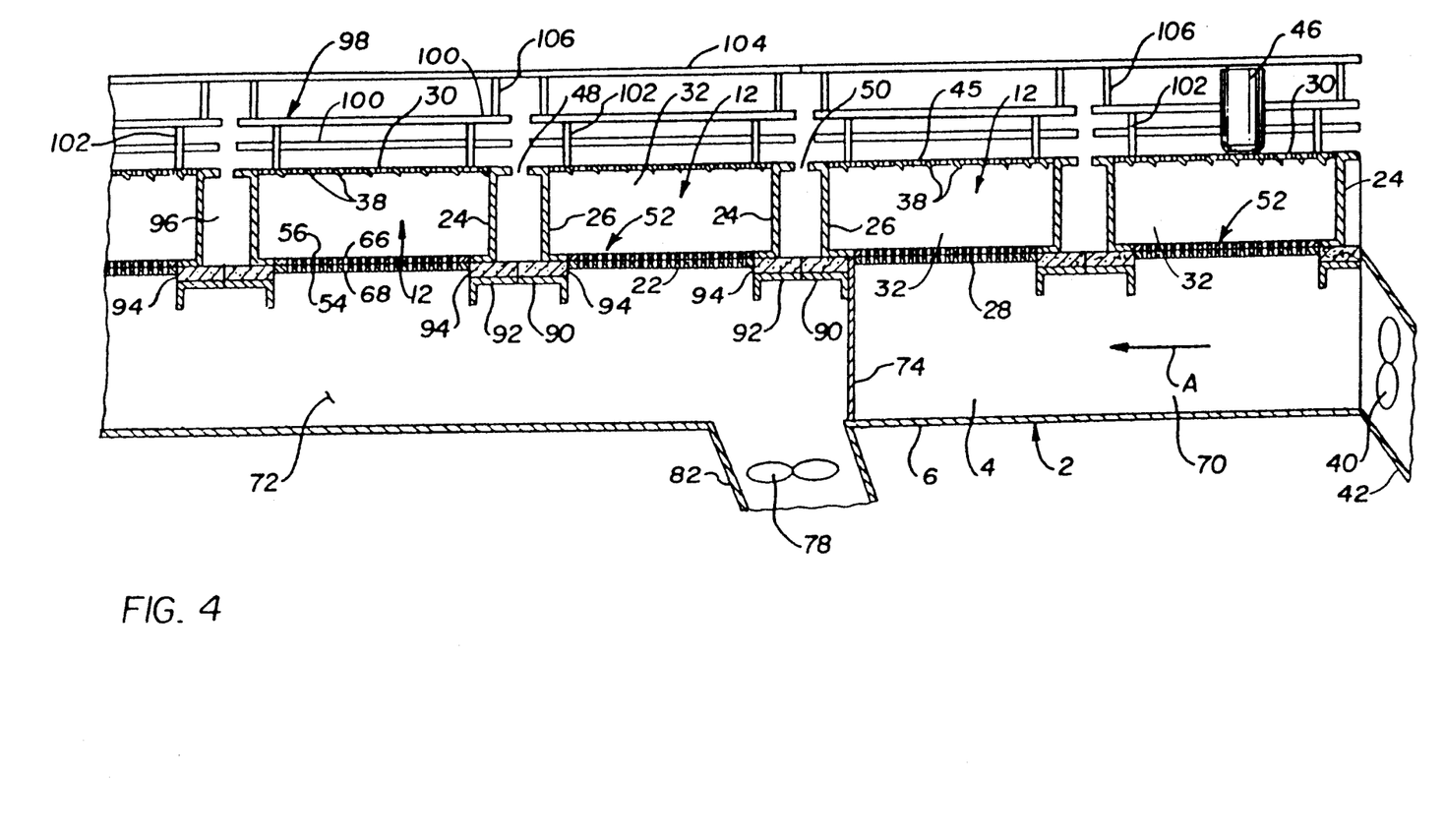
FIG. 4 is a longitudinal cross-sectional view of the air conveyor of FIG. 1 taken through 4—4.

FIG. 4 shows a longitudinal cross-sectional view of air conveyor 2. The ends 24, 26 of body members 12 are preferably in the form of Z-bars preferably extending across substantially the entire width and height of each secondary plenum 32. Ends 24, 26 resist the transfer of air between secondary plenums 32. In addition, ends 24, 26 support the ends of the sections of top deck 30 overlying the secondary plenums 32. It will be appreciated that, if desired, top deck 30 may be secured to ends 24, 26 using mechanical fasteners, such as bolts for example, or any other suitable means known to those skilled in the art. Securing top deck 30 to ends 24, 26 provides supports, or stiffeners, to top deck 30 that run perpendicular to the direction of travel of objects 46. Because air flow to top deck 30 is from directly beneath the top deck 30, the stiffeners formed by ends 24, 26 do not disrupt air flow within the secondary plenums 32.

Because there is no air flow between secondary plenums 32 joints 48, 50 between body members 12 are not under elevated air pressure from secondary plenums 32. Accordingly, there is little danger of air escaping from any gaps in joints 48, 50. It will be appreciated that if air were flowing between secondary plenums 32 to escape from joints 48, 50 between body members 12 the result would be an undesired vertical stream of air or, "air knife", perpendicular to object travel. "Air knife" disrupts the travel of objects on an air conveyor because the air flow is not in the desired direction. Because joints 48, 50 are not under elevated pressure from air flow between secondary plenums 32, 34, they resist "air knife".

Referring again to FIGS. 1 and 4, in order to join a plurality of body members 12 into a length of conveyor, one end 24 of a body member 12 will abut the immediately adjacent end 26 of the body member 12 immediately adjacent to the first body member 12. If desired, the abutting body members 14 may be secured to one another using any suitable means known to those skilled in the art in order to resist shifting of the body members during operation. In addition, body members 12 may be secured to underlying primary plenum 4 using any suitable means known to those skilled in the art.

In the preferred embodiment, the height of secondary plenum 32 may be about 2 to 6 inches but is preferably about 3 to 4 inches. The width of secondary plenum 32 may be about 18 to 56 inches but is preferably about 20 to 26 inches. Secondary plenums 32 preferably have generally rectangular cross-sectional shapes. The length of each body member 12 may be about 1 to 16 feet but is preferably about 4 to 8 feet. The length of each secondary plenum 32 preferably substantially equal to the length of each body member 12. It has been found that this length of secondary plenums 32 provides optimum balance between control of conveyor performance and manufacturing, assembling, and operating costs.

In the preferred embodiment, the width of top deck 30 is preferably substantially equal to or less than the width of secondary plenum 32 or in the range of about 18 to 56 inches. The distance between the outermost rows of directional orifices 45 is preferably about 18 to 56 inches. The length of each section of top deck 30 is preferably substantially equal to or less than the length of body members 12 or about 1 to 4 feet. Top deck 30 is preferably removably disposed over the secondary plenums 32 to permit easy removal of top deck 30 for maintenance. It will be appreciated that as the joints 48, 50 between longitudinally adjacent sections of top deck 30 are not required to interlock in order to resist "air knife", any section may be removed without requiring the removal of any adjacent section.

Openings 28 in the bottom wall 22 of each body member 12 may be provided with manually adjustable damper means 52. In the preferred embodiment, each opening 28 in bottom wall 22 preferably has an area of about 200 to 5,000 square inches. Damper means 52 may be used to restrict the size of openings 28 by obstructing a portion thereof, thereby regulating the air pressure between primary plenum 4 and secondary plenums 32.

Figure 5:
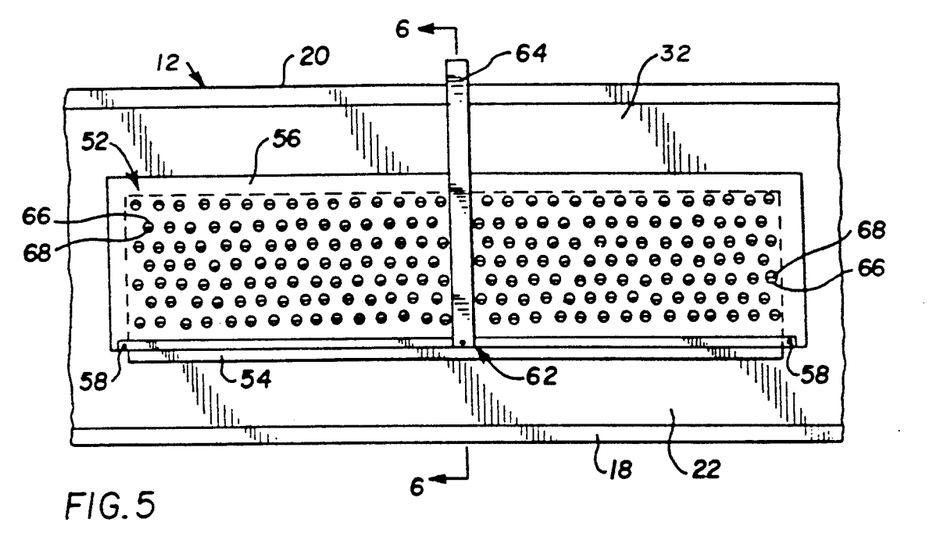
FIG. 5 is a plan view of the damper means utilized in the air conveyor of this invention.
Figure 6:
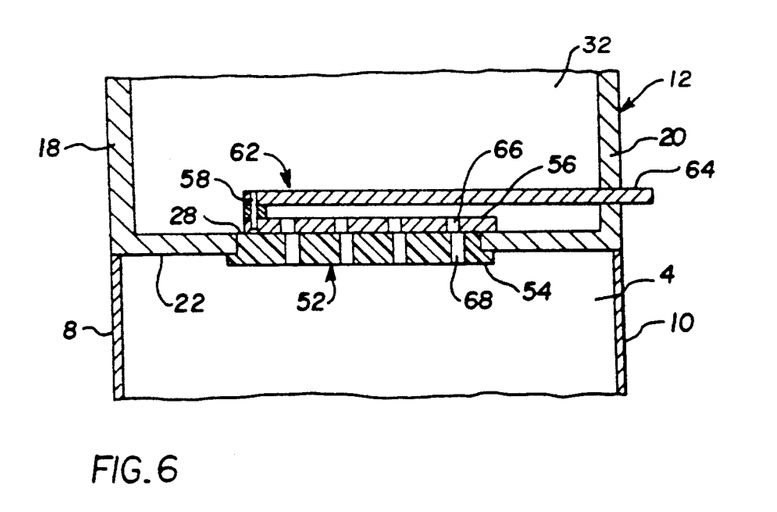
FIG. 6 is a transverse cross-sectional view of the damper means of FIG. 5 taken through 6—6.

Referring to FIG. 5 and 6, in the preferred embodiment, damper means 52 includes stationary bottom perforated plate 54 and movable top perforated plate 56. Bottom plate 54 is preferably secured covering opening 28 in bottom wall 22 of body member 16. A portion of bottom plate 54 is preferably inserted into opening 28 in bottom wall 22. Bottom plate 54 may be secured to bottom wall 22 by any suitable means known to those skilled in the art. In the preferred embodiment, bottom plate 54 is preferably made of resinous plastic material, such as polypropylene, polyvinylchloride, polyurethane, polyethylene, or acrylonitrile-butadiene-styrene, for example, so that it can conform to any irregularities in top plate 56. Top plate 56 is slidable in the transverse direction over the portion of bottom plate 54 inserted into opening 28 in bottom wall 22. Top plate 56 is preferably made from steel, but it will be appreciated that any suitable material may be used. Studs 58 are provided extending upwardly from the top of upper plate 56. Studs 58 are inserted into openings in slide assembly 62. Slide assembly 62 includes bar 64 which extends through sidewall 20 of body member 16. Bar 64 may be moved to position top plate 56 with respect to bottom plate 54.

Openings 66 are provided in top plate 56 and openings 68 are provided in bottom plate 54. When openings 66 are aligned with opening 68, there is maximum air flow from primary plenum 4 to secondary plenum 32. When bar 64 is moved forward or backward, openings 66 are no longer aligned with openings 68 and the total area of the opening between primary plenum 4 and secondary plenum 32 is reduced. As a result, less air flows between primary plenum 4 and secondary plenum 32. FIGS. 5 and 6 show damper means 52 in the partially closed position. By moving bar 64, the operator may adjust the air pressure in secondary plenum 32. Bar 64 may be provided with index marks which are visible outside body members 12. The index marks indicate the position of top plate 56 with respect to bottom plate 54, thereby indicating the relative positions of openings 66 with respect to openings 68. Since each secondary plenum 32 may be provided with separate damper means, each secondary plenum 32 is a separately controllable pressure zone for providing air to the top deck.

As shown in FIG. 5, in the preferred embodiment each opening 66, 68 is generally circular in shape and has a diameter of about 0.25 to 0.75 inches. However, it will be appreciated that openings 66, 68 may be and desired shape. The total area of the of the openings in plates 54, 56 of each damper means 52 is preferably about 4 to 10 percent of the area of plates 54,56. In the preferred embodiment, openings 66, 68 are preferably arranged in staggered rows with a diagonal center to center spacing of about 1 to 2 inches within the rows and a transverse center-to-center spacing of about 1 to 2 inches between rows. The thickness of top plate 56 is preferably about 0.03 to 0.13 inches and the thickness of bottom plate 54 is preferably about 0.06 to 0.13 inches. Top plate 56 preferably has generally the same shape in the plan view as opening 28 and is preferably about 0 to 10 percent larger than openings 28. It will be appreciated that while the preferred configuration is for the top plate of damper means 52 to be movable and the bottom plate fixed, the bottom plate may be made movable with the top plate remaining fixed. In addition, both plates may be movable.

Referring again to FIG. 4, in a preferred embodiment, primary plenum 4 may be divided into one or more zones 70, 72. The zones 70, 72 are separated by blank 74 which obstructs substantially the entire opening of primary plenum 4, thereby restricting air flow between zones 70, 72. Blank 74 extends over substantially the entire width and height of primary plenum 4. Each zone 70, 72 is provided with separate zone blower means 40, 78 in communication with each zone through ducts 42, 82. The length of each zone 70, 72 may be about 1 to 200 feet but is preferably 50 to 150 feet. In the preferred embodiment, the height of primary plenum 4 may be about 6 to 20 inches, but will preferably be about 10 to 20 inches. The width of primary plenum 4 may be about 12 to 60 inches, but is preferably about 18 to 48 inches. Primary plenum 4 preferably has a generally rectangular cross-sectional shape.

It will be appreciated that in the preferred embodiment, each secondary plenum 32 is preferably axially shorter than the axial length of zones 70, 72 of primary plenum 4. The longer primary plenum zones 70, 72 preferably transport air to a plurality of secondary plenums 32 which, in turn, are individually controllable pressure zones for delivering air to top deck 30. As a result, the volume and velocity of the air supplied to primary plenum zones 70, 72 may be increased without adversely affecting performance of the conveyor.

Referring to FIG. 4, in a preferred embodiment, body members 12 may be provided with cross members 90, 92 on the lower portion of the ends thereof. Cross members 90, 92 extend inside primary plenum 4 and across substantially the entire width of primary plenum 4 between sidewalls 8, 10. Cross members 90, 92 may be secured to body members 12 using any suitable means known to those skilled in the art. Cross members 90, 92 provide additional stiffening to top deck 30 and body members 12 which extend generally perpendicular to the direction of movement of objects 46. Sealing means 94 may be provided between cross members 90, 92 and body members 12. Sealing means 94 resists the flow of air from primary plenum 4 into the open area 96 between adjacent body members 12, thereby increasing the resistance of air conveyor 2 to "air knife". In the preferred embodiment, sealing means 94 is preferably made from foam weather stripping, such as that manufactured by Accurate Foam Company, under the trade designation closed cell neoprene, but may be made from any suitable material.

Cross members 90, 92 may be used as a bracket for securing blanks 74 within primary plenum 4 for dividing primary plenum 4 into zones 70, 72. It will be appreciated that blank 74 may be secured to cross member 90, 92 by any suitable method known to those skilled in the art.

As shown in FIGS. 1 and 2, in the preferred embodiment, generally longitudinal guide means 98 may be provided to define a path for object 46 movement on top deck 30. Guide means 98 preferably comprise one or more generally longitudinal guide rails 100 disposed on one or both sides of top deck 30 and extending above the elevation of top deck 30. Guide rail 100 also resists falling of objects 46 from top deck 30. It will be appreciated that if guide rails 100 are provided on both sides of top deck 30, the distance between guide rails 100 may be made adjustable in order to accommodate objects 46 of different sizes therebetween. Guide rails 100 may be adjustable by any suitable means known to these skilled in the art. The distance between guide rails 100 is preferably substantially equal to the width of top deck 30. Guide rails 100 are preferably attached to one or more vertical supports 102, which, in turn, may be connected to conveyor 2 by any suitable means known to those skilled in the art.

As shown in FIGS. 1 and 2, air conveyor 2 may also be provided with a generally planar cover 104 disposed over top deck 30. Cover 104 is preferably supported by vertical cover supports 106 which are preferably attached to guide rails 100 or to vertical supports 102. Alternatively, cover supports 106 may be attached directly to body members 12 and/or primary plenum 4. It will be appreciated that the distance between top deck 30 and cover 104 must be greater than the height of objects 46 and the air cushion in order to accommodate passage of the objects therebetween on the cushion of air. The distance between top deck 30 and cover 104 is preferably about 1/16 to ¼ inches greater than the height of objects 46. It has been found that disposing cover 104 at this height results in resistance to tipping of objects 46. Moreover, the distance between top deck 30 and cover 104 may be made adjustable to accommodate the passage of various size objects 46 therebetween.

Figure 7:
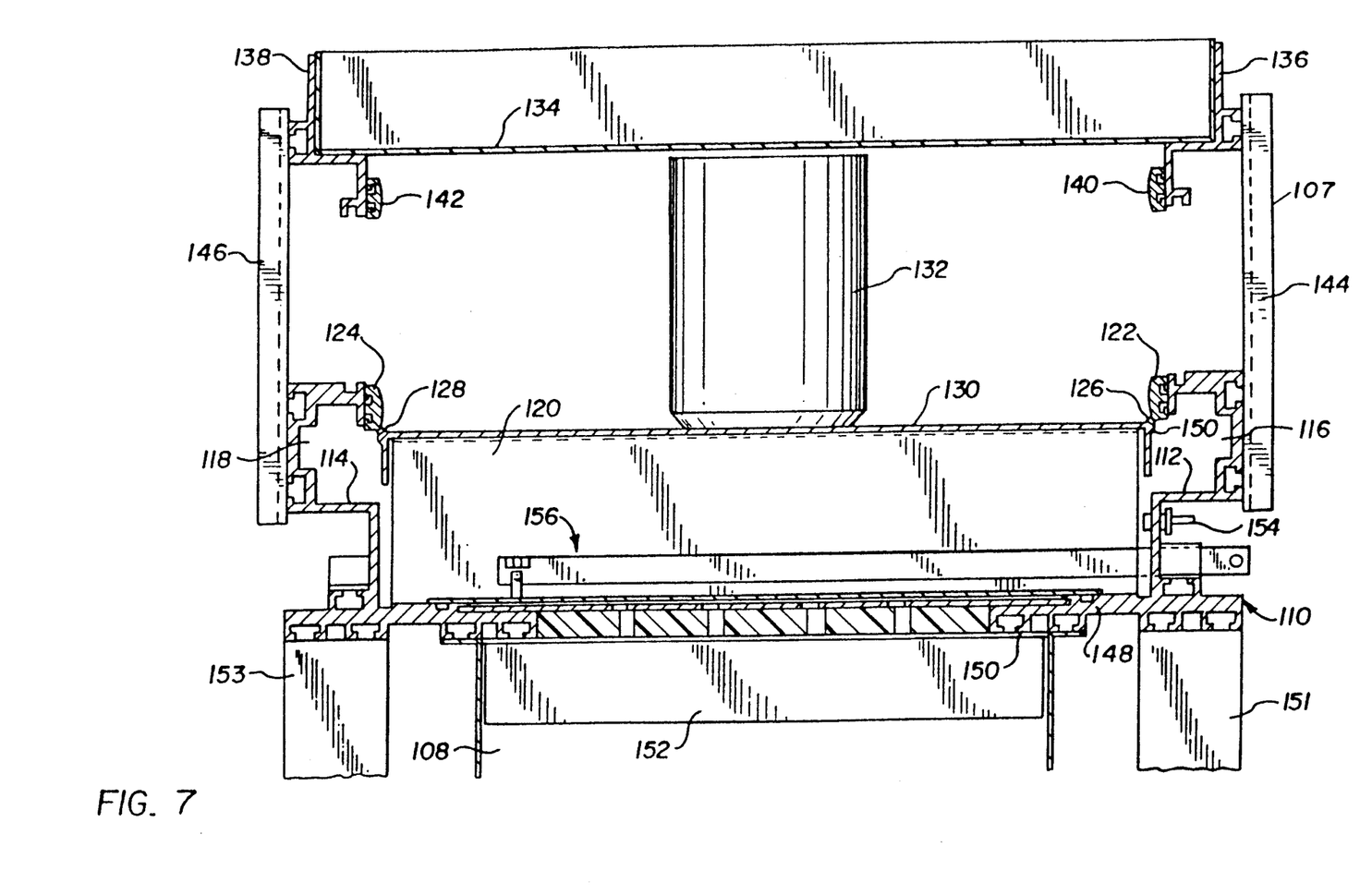
FIG. 7 is a transverse cross-sectional view similar to FIG. 2 of another embodiment of the air conveyor of this invention.

FIG. 7 shows a transverse cross-sectional view of another embodiment of an air conveyor 107 of this invention. In this embodiment, primary plenum 108 is substantially identical to primary plenum 4 of the embodiment previously discussed. Body member 110 is preferably provided with sidewalls 112, 114 having complex cross-sectional shapes forming side chambers 116, 118. The ends of body member 110 are preferably closed using ends (not shown) which are substantially identical to ends 24, 26 of the previously discussed embodiment. Side chambers 116, 118 are in communication with secondary plenum 120 such that air freely flows from secondary plenum 120 to side chambers 116, 118. Caps (not shown) may be provided over the ends of side chambers 116, 118 to resist the flow of air between side chambers and adjacent body members. Lower guide rails 122, 124 are preferably secured to upper portion sidewalls 112, 114. One or more longitudinally spaced openings 126, 128 may be provided through a portion of lower guide rails 122, 124 and sidewalls 112, 114 and in communication with side chambers 116, 118. Openings 126, 128 are preferably oriented horizontally at an angle of about 0 to 60 degrees with respect to the transverse axis. Air from side chambers 116, 118 may be discharged through openings 126, 128 to provide generally horizontally directed air jets which assist the main air flow on top deck 130 in guiding objects 132 toward the center of the air conveyor. In addition, when air conveyor 107 includes generally a horizontal turn, the air jets from openings 126, 128 will assist in guiding objects 132 into the turns.

In the embodiment shown in FIG. 7, cover 134 is supported by top cover support rails 136, 138. Top cover support rails 136, 138 may also be provided with upper guide rails 140, 142. Top cover support rails 136, 138 are supported by vertical support brackets 144, 146 which may be secured to body member 110 using any suitable means known to those skilled in the art.

In the embodiment shown in FIG. 7, body member 110 is preferably formed from extruded aluminum, steel, or other suitable material. Bottom wall 148 is shown as being provided with projections 150 which support body member 110 on primary plenum 108 and to which cross member 152 may be secured. In addition, support legs 151, 153 may be provided to support body member 110.

Also shown in FIG. 7 is hose barb 154 on sidewall 112 of body member 110. A pressure gauge may be connected to hose barb 154 to measure the air pressure in secondary plenum 120. It will be appreciated that a similar hose barb may be provided on body members 12 of the previously discussed embodiments.

The embodiment shown in FIG. 7 may also be provided with damper means 156. Damper means 156 is preferably substantially identical to damper means 52 previously discussed.

In all of the hereinbefore discussed embodiments, primary plenum 4, 108 is preferably constructed of metal air carrying duct material of a type known to those skilled in the art. Top deck 30, 130 is preferably made from single thickness steel sheet or double thickness laminated steel sheet, but may be made from any suitable material. In the embodiment shown in FIGS. 1-4, body members 12 are preferably made from steel, aluminum, or any other suitable material.

It will be appreciated that typical air conveyor applications do not always lend themselves to the utilization of straight conveyors from one location to another. Accordingly, to produce generally horizontal turns with respect to the longitudinal axis of the conveyor, body members may be provided having one or both ends which are disposed at an angle with respect to the transverse axis of the conveyor. When an angled end of a body member abuts the end of a body member which is parallel to the transverse axis of the conveyor, it changes the horizontal orientation of the longitudinal axis of the first body member, thereby producing a turn in the direction of object travel. The end of such a body member is preferably disposed at an angle of about 30 to 60 degrees with respect to the transverse axis. Alternatively, the conveyor of this invention may include one or more substantially straight portions with respect to the longitudinal direction and/or one or more portions which are generally curved with respect to the longitudinal direction.

It will be appreciated that the transport and storage capacity of the air conveyor/accumulator of this invention may be matched with the capacity of work stations to which it provides objects.

For convenience of illustration, the blower ducts and primary plenum have been shown as being generally rectangular in cross-sectional shape. It will be appreciated that these components could be provided having other suitable cross-sectional shapes.

It will be appreciated that this invention provides an air conveyor that give increased control over conveyor performance by providing short, manually adjustable pressure zones for delivery of air to the top deck without requiring the use of a large number of blower means. Moreover, it will be appreciated that this invention provides an air conveyor which may be assembled quickly and cost effectively and which may be adapted to a wide variety of applications.

Whereas particular embodiments of the invention have been described above for purposes of illustration, it will be evident to those skilled in the art that numerous variations in the details may be made without departing from the invention as defined in the appended claims.

We claim:

1. An air conveyor for moving objects comprising:
   an elongated primary plenum,
   a plurality of elongated body members disposed over and in communication with said primary plenum wherein each of said plurality of body members is shorter than said primary plenum.

a plurality of generally planar top decks disposed over said plurality of body members, said decks having a plurality of relatively spaced directional orifices formed therein, said plurality of body members and said plurality of top decks cooperating to define a plurality of secondary plenum in communication with said primary plenum, a partition separating said primary plenum and said plurality of secondary plenums, said partition including damper means comprising a stationary perforated plate, a slidable perforated plate, and means for adjusting the slidable plate with respect to said stationary plate, and blower means in communication with said primary plenum for providing air to said plurality of secondary plenums through said primary plenum for delivery through said directional orifices, whereby said objects may be supported and moved longitudinally on a cushion of said air and flow of said air can be regulated by adjustment of said slidable plate with respect to said stationary plate.

2. The air conveyor of claim 1 wherein
each said body member has two sidewalls and is closed at each end.

3. The air conveyor of claim 2 wherein
at least one closed end of each said body member abuts a closed end of another of said plurality of body members.

4. The air conveyor of claim 1 wherein
said primary plenum is divided into longitudinal zones,
each said zone is closed at each end, and
each said zone is provided with zone blower means for supplying air to each said zone.

5. The air conveyor of claim 4 wherein
each said zone of said primary is about 1 to about 200 feet long.

6. The air conveyor of claim 5 wherein
each said zone of said primary plenum is about 50 to 150 feet long.

7. The air conveyor of claim 1 wherein
said slidable plate is disposed over said stationary plate.

8. The air conveyor of claim 1 wherein
said stationary and slidable plates have generally circular perforations therein, and
each said perforation has a diameter of about $\frac{1}{4}$ to $\frac{3}{4}$ inches.

9. The air conveyor of claim 8 wherein
said perforations are arranged in staggered rows with a longitudinal center-to-center spacing of about 1 to 2 inches within said rows and center-to-center spacing of about 1 to 2 inches between said rows.

10. The air conveyor of claim 8 wherein
said perforations comprise about 4 to 10 percent of said plates.

11. The air conveyor of claim 1 wherein
said slidable plate is made from steel, and
said stationary plate is made from resinous plastic material selected from the group consisting of polypropylene, polyvinylchloride, polyurethane, polyethylene, or acrylonitrile-butadiene-styrene.

12. The air conveyor of claim 1 wherein
said directional orifices have means thereon for directing said air generally longitudinally along at least one of said top deck at an angle of about 10 to 90 degrees above horizontal.

13. The air conveyor of claim 1 wherein
said top decks are removably disposed over said body members.

14. The air conveyor of claim 1 wherein
each said body member has generally longitudinal guide means defining a path for object movement.

15. The air conveyor of claim 14, wherein
said guide means include guide rails extending above at least one of said top decks.

16. The air conveyor of claim 15 wherein
said guide rails are disposed on both sides of said at least one top deck.

17. The air conveyor of claim 1, further comprising a generally planar cover disposed over at least one of said top decks, and
generally vertical support means for supporting said cover over said at least one deck top wherein
said cover is disposed above said at least one top deck approximately 1/16 to $\frac{1}{4}$ inches higher than the objects conveyed on said conveyor.

18. The air conveyor of claim 1 wherein
said primary plenum is about 12 to 60 inches wide and about 6 to 20 inches high.

19. The air conveyor of claim 1 wherein
said primary plenum is about 18 to 48 inches higher and about 12 to 16 inches high.

20. The air conveyor of claim 1 wherein
said secondary plenums are about 18 to 60 inches wide and about 2 to 6 inches higher, and
said top decks are in width substantially equal to or less than said secondary plenums.

21. The air conveyor of claim 20 wherein
each said body member is about 1 to 16 feet long.

22. The air conveyor of claim 20 wherein
each said body member is about 4 to 8 feet long.

23. The air conveyor of claim 1 wherein
said secondary plenums are about 24 to 49 inches wide and about 2 to 4 inches high.

24. The air conveyor of claim 1 wherein
said blower means is sized to supply said air to said primary plenum at about 1,000 to 5,000 feet per minute velocity, 5,000 to 27,000 CFM in volume, and $\frac{1}{2}$ to 4 inches W.G. pressure.

25. The air conveyor of claim 1 wherein
said blower means is sized to supply said air to said primary plenum at about 1,000 to 5,000 feet per minute velocity, 10,000 to 26,000 CFM in volume, and $\frac{1}{2}$ to 3 inches W.G. pressure.

26. The conveyor of claim 1 which further comprises a plurality of cross members disposed between said plurality of elongated body members to stiffen said top decks.

27. An air conveyor for moving objects comprising an elongated primary plenum having an upper wall,
a plurality of elongated body members disposed over and in communication with said primary plenum, each said body member having a bottom wall which is common with the upper wall of said primary plenum, two sidewalls, and two closed end, wherein at least one of said closed ends abuts a closed end of another of said plurality of body members and each said body member is axially shorter than said primary plenum,
a generally planar top deck disposed over each said body member and having a plurality of relatively spaced directional orifices formed therein, said body members and said top decks cooperating to define a plurality of secondary plenums in communication with said primary plenum, a partition in said upper wall separating said primary plenum and said plurality of secondary plenums, said partition having at least one opening therein which includes damper mean comprising a stationary perforated plate and a slidable perforated plate cooperating with said stationary plate and means for adjusting the slidable plate with respect to said stationary plate, and said primary plenum includes means for communicating with blower means for providing air to said secondary plenums for delivery through said directional orifices, whereby said objects may be supported and moved longitudinally along a cushion of said air.

28. The air conveyor of claim 27 wherein
said slidable plate is disposed over said secondary plate.

29. The air conveyor of claim 27 wherein
said slidable plate is made from steel, and
said stationary plate being made from resinous plastic material selected from the group consisting of polypropylene. polyvinylchlorde. polyurethane, polyethylene. or acrylonitrile-butadiene-styrene.

30. An air conveyor for moving objects comprising
an elongated generally upwardly open primary plenum.

at least two body members disposed over and in communication with said primary plenum. each said body members having two sidewalls. a bottom wall, and closed at each end.

a generally planar top deck disposed over each said body member and having a plurality of relatively spaced directional orifices formed therein, each said body member and said top deck cooperating to define a secondary plenum in communication with said primary plenum through at least one opening in the bottom wall of the body member that defines said secondary plenum, and at least one of said sidewalls of each said body member defining a side chamber in communication with said, secondary plenum. and said primary plenum includes means for communicating with blower means for providing air to said secondary plenums through said primary plenum for delivery through said directional orifices, whereby said objects may be supported and moved longitudinally on a cushion of said air.

31. The air conveyor of claim 30 wherein
said primary plenum is divided into longitudinal zones,
each said zone is closed at each end, and
said primary plenum includes means for communication with zone blower for supplying said air to each said zone.

32. The air conveyor of claim 30, further comprising
damper means interposed between said primary plenum and said secondary plenums for regulating the openings therebetween.

33. The air conveyor of claim 32 wherein
said damper means has a stationary perforated plate in said bottom wall of each of said body members, and a slidable perforated adjacent plate cooperating with each said stationary plate, and slide means for adjusting said slidable plate with respect to said stationary plate to regulate air flow through said damper means.

34. The air conveyor of claim 33 wherein said stationary perforated plates and said slidable perforated plates in said damper means have
perforations therein comprising about 4 to 10 percent of said plates.

35. The air conveyor of claim 30 wherein
said directional orifices have means thereon for directing said air generally longitudinally along said top deck, in which said directional orifices are formed, at an angle of about 10 to 90 degrees above horizontal.

36. The air conveyor of claim 30 wherein
each said body member has generally longitudinal guide means defining a path for object movement.

37. The air conveyor of claim 36 wherein
each said guide means has one or more guide rails disposed on at least one side of, and extending above, said top deck which is disposed over the body member having said guide means.

38. The air conveyor of claim 37 wherein
at least one of said guide rails is provided with at least two directional orifices in communication with said side chamber defined by the body member which has said at lest one guide rail thereon, whereby additional longitudinal air flow is provided on said top deck which is disposed over such body member.

39. The air conveyor of claim 38 wherein
said directional orifices on said at least one guide rail are provided with means thereon for discharging said air generally longitudinally from said side chamber defined by the body member which has said at least one guide rail thereon at an angle of about 0 to 60 degrees with respect to a transverse axis.

40. The air conveyor of claim 30 further comprising
a generally planar cover disposed over at least one of said top decks, and
generally vertical support means supporting said generally planar cover over said at least one top deck about 1/16 to ¼ inches above the objects being conveyed on said conveyor.

41. An air conveyor for moving objects comprisng:
an elongated primary plenum,
a plurality of secondary plenum disposed over and parallel to said primary plenum, each of said secondary plenums having a generally planar top deck with a plurality of spaced orifices therein,
a plurality of partitions separating said plurality of secondary plenums from said primary plenum, each said partition including damper means comprisng two plates, each of which has a plurality of perforations therein, and means for moving one of said plates relative to the other, and
blower means in communication with said primary plenum to supply air into said primary plenum for flow through said perforations into said secondary plenums and out of said secondary plenums through said orifices in the top deck associated with said at least one secondary plenum whereby said objects may be supported on and conveyed along said associated top deck.

42. The air conveyor of claim 41 which further comprises a plurality of cross members disposed transversely across said conveyor to stiffen said top decks on said plurality of secondary plenums.

* * * * *